Patented Aug. 14, 1945

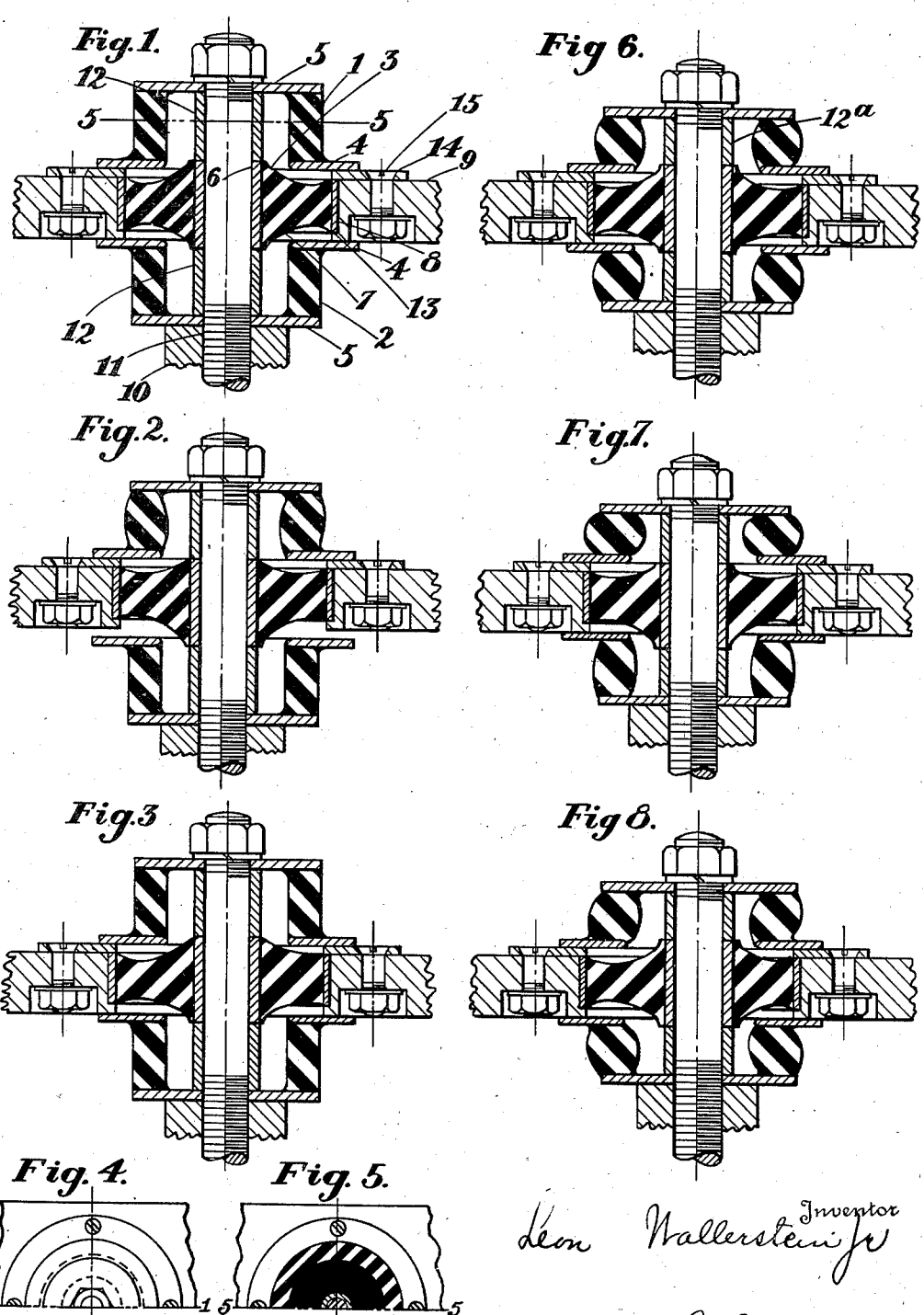

2,382,372

UNITED STATES PATENT OFFICE 2,382,372

RESILIENT MOUNTING

Leon Wallerstein, Jr., Erie, Pa., assignor to Lord Manufacturing Company, Erie, Pa., a corporation of Pennsylvania Application October 29, 1942, Serial No. 463,739

7 Claims. (Cl. 248—358)

The present invention is directed to resilient mountings and is designed to provide such a mounting that may, through simple adjustment or variation, provide a wide range of deflection characteristics.

In carrying out the invention, the mounting is formed with a plurality of units, these units having different characteristics, the units supplementing each other and associated to provide the desired resultant deflection characteristic.

The invention is also one capable of withstanding severe shocks in all directions and one in which the movement is limited by the metal parts so as to provide ample safety in its use.

In carrying out the invention, the supplemental units preferably provide those subjected to shear and direct stress under load in one direction and place the resilient element in shear and direct stress in a reverse order. By varying the relation of these supplementing units, almost any variation in the resultant characteristic as desired may be accomplished.

Features and details of the invention will appear more fully from the specification and claims.

Preferred embodiments of the invention are illustrated in the accompanying drawings as follows:

Fig. 1 shows a central vertical section through a mounting on the line 1—1 in Figs. 4 and 5; with the parts in neutral.

Fig. 2 a similar view with the parts under axial load.

Fig. 3 a similar view with the parts under horizontal load, the load being directed toward the right, as seen in that figure.

Fig. 4 a half plan view of the mounting.

Fig. 5 a half section on the line 5—5 in Fig. 1.

Fig. 6 a view similar to Fig. 1 except that two of the units (top and bottom) are preloaded.

Fig. 7 a similar view with the mounting as a whole under axial load.

Fig. 8 a view similar to Fig. 6 but with the mounting as a whole under horizontal load toward the right.

Figure 9:
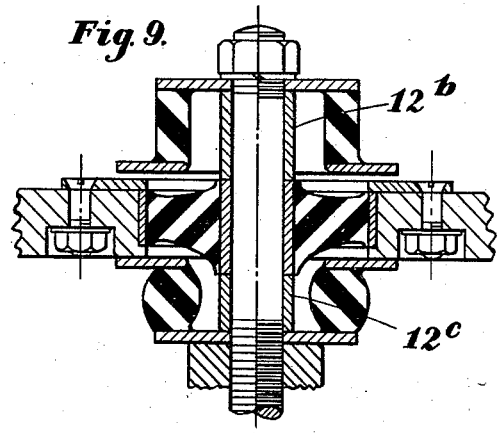

Fig. 9 a view having parts similar to Fig. 1 except the central and bottom members are preloaded against each other.

Figure 10:
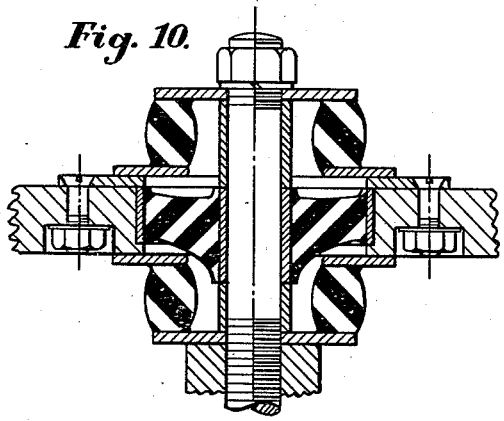

Fig. 10 a view similar to Fig. 9 with the mounting under axial load.

Figure 11:
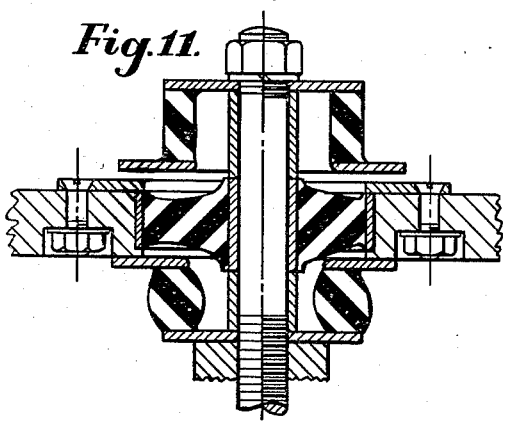

Fig. 11 a view similar to Fig. 9 with the mounting subjected to horizontal load toward the right.

Figure 12:
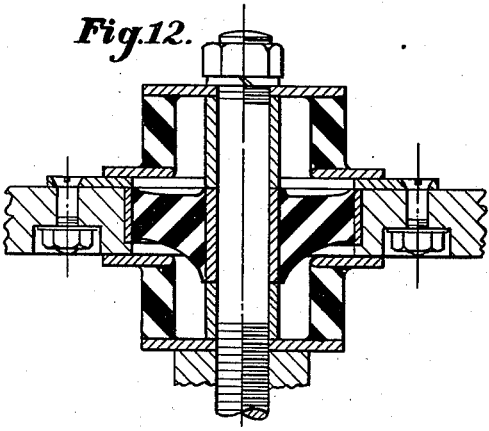

Fig. 12 corresponds to Fig. 10, and shows under axial load a structure similar to that of Fig. 9 except that the amount of preloading is varied.

Figure 13:
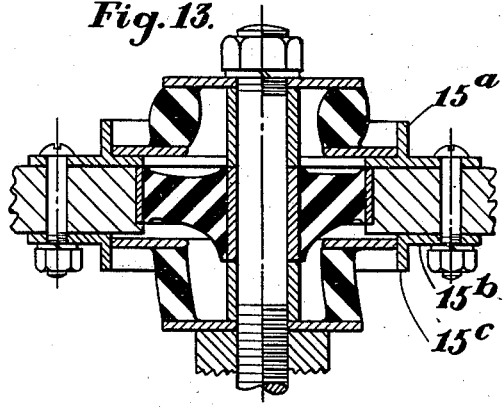

Fig. 13 a view similar to Fig. 1, but subject to both axial and radial loads, and with at least one of the units related to another of the units so that at least one unit is subjected to shear stress for any type of loading, accompanied by direct stress or no stress in its companion unit.

Figure 14:
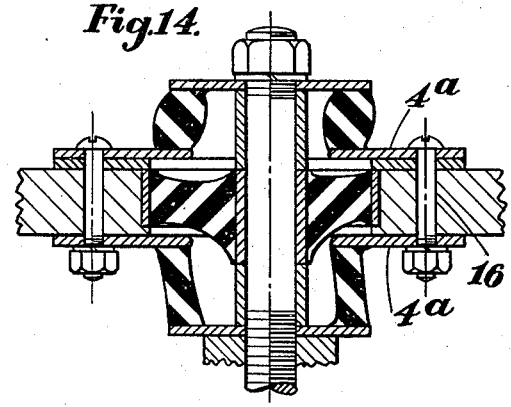

Fig. 14 shows a view similar to Fig. 1 but subject to both axial and radial loads, except that all units are attached so that each one is subjected to direct stress through either compression or tension, or to shear stress depending on the direction of load, and are releated to carry the load through shear stress of at least one unit, supplemented by direct stress of at least one other unit.

Referring to Fig. 1, the mounting as a whole, as there shown, is made up of three units, a top unit 1, bottom unit 2, and intermediate unit 3. Units 1 and 2 are of similar structure, each containing a base plate 4, an annular resilient element, and a cap plate 5, the resilient element being preferably bonded to the cap plate and to the base plate. The unit 3 is a sleeve type mounting having a central sleeve 6, a resilient element 7, and an outer shell 8, the resilient element being bonded to the inner member and outer member or shell.

9 and 10 mark supported and supporting members. A stud 11 is secured in the member 10. It extends through the caps 5 and the shell 6. Spacing collars or sleeves 12 are arranged between the ends of the sleeve 6 and the caps 5.

The member 9 is provided with a shoulder 13 which engages one end of the sleeve 8 and a plate 14 extends over the opposite end of the sleeve, the plate 14 being secured to the member 9 by screws 15. The shoulder 13 and that formed by the plate 14 secure the unit 3 to sustain axial loads. The base plates 4 are, in this arrangement, just in contact with the member 9 and the plate 14 with the resilient elements in neutral.

When an axial load is placed on the mounting, the parts assume the position shown in Fig. 2. The resilient elements of the upper unit 1 are compressed and the resilient element 7 of the unit 3 is stressed in shear. Thus the two units supplement each other in carrying the load, but the deflection characteristic is the resultant of the compression of unit 1 and the shear resistance of the unit 3. Here the unit 2, under the load, as shown, is out of action and remains neutral. Should the axial load reverse, the reverse action on the resilient elements takes place.

In Fig. 3 the mounting is shown as being subjected to a horizontal load. Thus the units 1 and 2 are inactive and the unit 3 is moved radially, the dominant stress being through tension and compression in the direction of load with a slight shear effect at the sides.

In Figs. 6, 7 and 8, the mounting elements are similar to those of Fig. 1 except that the spacer plates 12a in Figs. 6, 7 and 8 are shorter than the spacers 12 in Fig. 1. The result of this is to preload the resilient elements of units 1 and 2 against each other, and in Fig. 6 the parts are shown under no external load.

In Fig. 7 the parts are shown as subjected to axial load. It will be noted here that the resilient element of unit 1 is further compressed. The resilient element of unit 2 is relieved to some extent of its compression, and unit 3 is stressed in shear axially.

In Fig. 8 the mounting is subjected to horizontal load, so that the resilient element of unit 3 is subjected to compression and tension in the direction of the load, and the resilient elements of units 1 and 2 are subjected to shear stress by reason of the frictional engagement of the base plates 4 with the members 9 and the plate 14.

If this load moves the parts a sufficient distance, the resilient elements may afford sufficient shear effort to overcome the frictional engagement of the plates 4 so that the stress may be relieved to some extent by the movement and in the structure as shown the plates have been moved slightly off center as indicated. This sliding action of the plates produces friction damping which is advantageous under numerous conditions, and the point at which such sliding starts may be controlled by the amount of preload.

In Fig. 9 units 2 and 3 are preloaded against each other but the relation of the spacing sleeves 12b and 12c differs slightly from the equal spacing of Fig. 1, placing that unit 1 with the mounting in neutral out of action. Other than this the operation in general is the same as that described as to the other figures.

In Fig. 10 a mounting similar to Fig. 9 is shown under axial load, the load being sufficient to bring the unit 1 into action and subjecting the resilient element thereof to direct stress. The load here, however, tends to release the compression of unit 2 but subjects unit 3 to shear stress. Thus there is a combined resultant of these units in the action of the mounting as a whole.

In Fig. 11 the structure is similar to that of Figs. 9 and 10 but the mounting is subjected to a horizontally directed load, placing the resilient element of unit 3 under compression and tension in the direction of the load and subjecting the resilient element of unit 2 to shear stress.

In Fig. 12 the parts correspond to those of Fig. 9 but show the parts subjected to an axial load which neutralizes the units 1 and 2 so that under this particular loading the entire load is carried by unit 3 in shear.

Fig. 13 shows a structure similar to Fig. 1 except that the plate 14 has an annular flange 15a, and the plate 15b with a flange 15c is arranged at the bottom of the member 9. The flanges 15a and 15c secure the base plates 4 against lateral movement but permit free vertical movement. In the structure shown in Fig. 13 the mounting is shown under axial and horizontal load so that unit 1 is under compression, unit 3 under direct stress in the direction of the load (toward the left), and the resilient elements of units 1 and 2 are under shear stress.

Fig. 14 differs from Fig. 1 in that the base plates 4a are definitely secured to the member 9 so that under axial load the resilient element of one or the other of the units 1 and 2 is put under tension and the other of said units under compression. As shown in Fig. 14, the mounting is under axial load downwardly, placing unit 1 under compression, unit 2 under tension, and unit 3 under shear stress. As shown, the mounting is also subjected to horizontal load toward the left, placing the resilient element of unit 3 under compression and tension and the resilient elements of units 1 and 2 under shear stress.

From these examples it will be evident that these units may be made to supplement each other to provide almost any variation of characteristics. Thus they may be made such that the resistance to movement is practically equal in all directions. They may be made so that the resistance in one direction is greater than in another. They may be made also so that there may be variations in the change of rate of deflection. At the same time it provides a simple mounting of very large capacity because the units supplement each other and one of unusual safety because all of the rubber elements may fail without releasing the individual parts of the mounting.

What I claim as new is:

1. In a resilient mounting having members for connection between a load and a support, a sandwich unit having opposed plates connected by a resilient element such as rubber, one sandwich plate being secured for movement with one of said members and the other sandwich plate slidably engaging the other of said members to provide friction damping.

2. In a resilient mounting having members for connection between a load and a support, a sandwich unit having opposed plates connected by a resilient element such as rubber, one sandwich plate being secured for movement with one of said members and the other sandwich plate slidably engaging the other of said members to provide friction damping, and means adjustably compressing the sandwich unit against said other member to vary the point at which the friction damping takes place.

3. In a resilient mounting having opposed members for connection between a load and a support and a resilient element such as rubber connecting said members and yielding in shear in one direction and in compression in another direction, a sandwich unit having opposed plates connected by a resilient element such as rubber and yielding in shear in said other direction, one sandwich plate being secured for movement with one of said members and the other sandwich plate slidably engaging the other of said members for movement in said other direction to provide friction damping.

4. In a resilient mounting having opposed members for connection between a load and a support and a resilient element such as rubber connecting said members and yielding in shear in one direction and in compression in another direction, a sandwich unit having opposed plates connected by a resilient element such as rubber and yielding in shear in said other direction, one sandwich plate being secured for movement with one of said members and the other sandwich plate presented to and freely movable in said one direction into and out of abutting relationship with said other member.

5. In combination with a tubular mounting having inner and outer members for connection between a load and a support and resilient material such as rubber connecting the members, a sandwich unit having opposing plates transverse to the axis of the tubular mounting and connected by resilient material such as rubber, one sandwich plate being secured for movement with one of said members, and the other of said sandwich plates being free to move laterally of the axis of the tubular mounting and slidably abutting the other of said members.

6. In combination with a tubular mounting having inner and outer members for connection between a load and a support and resilient material such as rubber connecting the members, a sandwich unit having opposing plates transverse to the axis of the tubular mounting and connected by resilient material such as rubber, one sandwich plate being secured for movement to one of said members, the other sandwich plate being presented to and freely movable into and out of abutting relationship with the other of said members, and a guide surface on the other of said members extending along the axis of the tubular mounting and slidably engaging the other sandwich plate to prevent its movement radial to the axis of the tubular mounting.

7. In combination with a tubular mounting having inner and outer members for connection between a load and a support and resilient material such as rubber connecting the members, a sandwich unit having opposing plates transverse to the axis of the tubular mounting and connected by resilient material such as rubber, one sandwich plate being secured for movement with one of said members, the other of said sandwich plates being free to move laterally of the axis of the tubular mounting and slidably abutting the other of said members, and means compressing the sandwich unit against said other member to provide a friction force resisting lateral movement of said other plate.

LEON WALLERSTEIN, Jr.